United States Patent
Tsunoda et al.

(10) Patent No.: US 7,364,195 B2
(45) Date of Patent: Apr. 29, 2008

(54) RIDER RESTRICTION DEVICE OF TWO-WHEELED VEHICLE

(75) Inventors: Kazuhiko Tsunoda, Wako (JP); Norihiro Kurata, Wako (JP); Hideaki Akiyama, Wako (JP); Yutaka Murata, Wako (JP); Takashi Ogino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 11/175,429

(22) Filed: Jul. 5, 2005

(65) Prior Publication Data

US 2006/0048989 A1   Mar. 9, 2006

(30) Foreign Application Priority Data

Aug. 27, 2004   (JP)   ............................. 2004-248274

(51) Int. Cl.
*B60R 21/04*   (2006.01)
(52) U.S. Cl. .................. 280/751; 180/219; 280/304.4; 280/748
(58) Field of Classification Search ............... 280/291, 280/748, 751, 753, 304.3, 304.4; 180/219; 296/78.1
See application file for complete search history.

(56) References Cited

U.S. PATENT DOCUMENTS 1,431,866 A * 10/1922 Bacchi ...................... 296/78.1
4,136,890 A * 1/1979 Vertucci ..................... 296/78.1

FOREIGN PATENT DOCUMENTS

| | | |
|---|---|---|
| DE | 28 36 981 | 3/1979 |
| DE | 27 44 838 | 4/1979 |
| DE | 32 44 967 | 6/1984 |
| DE | 103 06 677 | 8/2004 |
| GB | 2 003 096 A * | 3/1979 |
| GB | 1 547 558 | 6/1979 |
| GB | 2 130 150 | 5/1984 |
| GB | 2 131 757 | 6/1984 |
| JP | 2705775 | 10/1997 |

* cited by examiner

*Primary Examiner*—Ruth Ilan
(74) *Attorney, Agent, or Firm*—Hamre, Schumann, Mueller & Larson, P.C.

(57) ABSTRACT

The present invention provides a rider restricting device of a two-wheeled vehicle which is easily applicable to a small-sized vehicle and, at the same time, can absorb a frontward load and alleviate a load applied to a rider. The rider restricting device has left and right knee portion pads such that a pad support member for each mounts to a connecting member such that a load absorbing member is mounted in either the pad support member or the connecting member.

7 Claims, 7 Drawing Sheets

RIDER RESTRICTION DEVICE OF TWO-WHEELED VEHICLE

FIELD OF THE INVENTION

The present invention relates to a rider restriction device of a two-wheeled vehicle, and more particularly to a rider restriction device of a two-wheeled vehicle which restricts a lower half part of a rider from moving in the forward direction of the vehicle body.

BACKGROUND OF THE INVENTION

Japanese Patent 2705775 discloses a technique for restricting a lower half part of a rider from moving toward a front portion of a vehicle body in a four-wheeled automobile that arranges an impact absorbing member on a lower portion of an instrument panel cabin and at a position which faces knees of the rider.

The technique described in Japanese Patent 2705775 is proposed on the premise that a support member which supports the impact absorbing member is provided in front of the knee portions of the rider and hence, the technique is not applicable to a vehicle such as a motorcycle which has no support member in front of the knee portions of the rider.

It is an object of the present invention to solve the above-mentioned drawback of the above-mentioned related art and can restrict a lower half part of a rider on a two-wheeled vehicle from moving in the frontward direction of the vehicle body.

SUMMARY OF THE INVENTION

To achieve the above-mentioned object, the present invention is characterized in that following means are provided in a rider restriction device which restricts the movement of a rider of a two-wheeled vehicle in the direction toward a front portion of a vehicle body.

A rider restriction device is provided comprising a pair of left and right knee portion pads; a pipe-like pad support member which mounts the knee portion pads on one end side thereof; a fixing member which fixes another end side of the pad support member in a state that the knee portion pads face knee portions of the rider; and a load absorbing member which absorbs a forward load applied to the knee portion pads thus restricting the plastic deformation of the pad support member.

A portion of a load applied to the knee portion pad is consumed and absorbed by a load absorbing member and hence, the plastic deformation of the pad support member can be restricted. Accordingly, even when a frontward load in which a stress applied to the pad support member exceeds an elastic limit is applied to the knee portion pad, the frontward load is received whereby it is possible to surely restrict the rider.

The load absorbing member may comprise a collapse prevention member which restricts the collapse deformation of the pad support member. Therefore, it is possible to easily restrict the plastic deformation of the pad support member without applying a particular forming on the pad support member.

The load absorbing member may be a resilient member or a coil spring which is inserted into a plastic deformation portion of the pad support member. It may also be a bellows-like collapsible body which is formed on the pad support member. It is possible to restrict the plastic deformation of the pad support member by merely adding the resilient member, the coil spring or the bellows-like collapsible body.

The fixing member may be a pipe-like connecting bar that is connected with another end side of the pad support member perpendicularly and extends in the lateral direction of a vehicle body, and the load absorbing member is a resilient member which is inserted in the inside of the connecting bar and restricts the torsional deformation of the connecting bar. In a constitution which imparts the elasticity to the pad support member by making use of a torsional stress of the connecting bar, it is possible to easily restrict the plastic deformation of the connecting bar.

The rider restriction device may further include a reinforcing member which restricts a front tilting amount of the pad support member. Since the front inclination amount of the handle connecting member can be restricted, it is possible to maintain the position of the restricting pad at a given height or more.

DETAILED DESCRIPTION OF THE INVENTION

Figure 1:
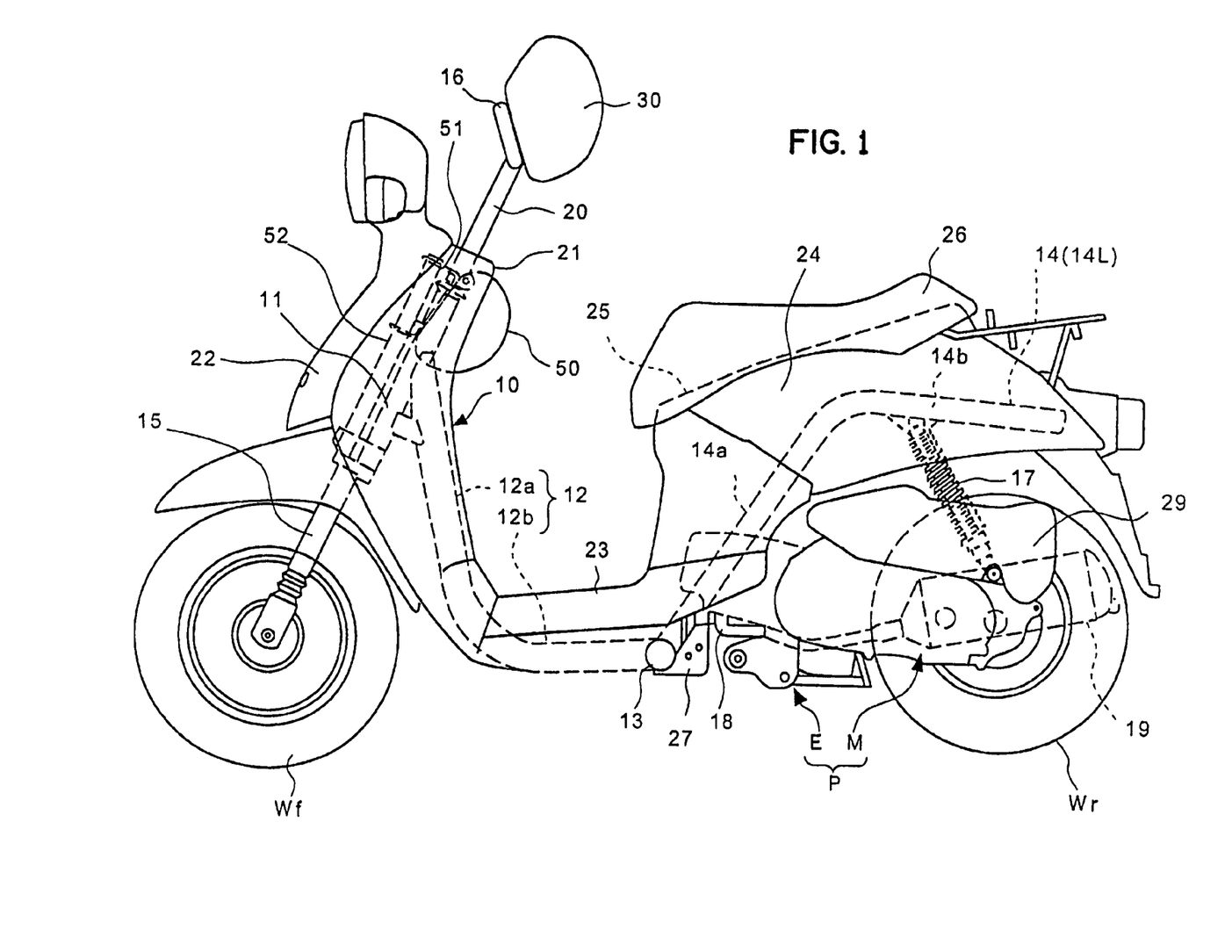
FIG. 1 A side view of a scooter-type motorcycle to which a rider restriction device of the present invention is applied.

An embodiment of the present invention is explained hereinafter in detail in conjunction with drawings. FIG. 1 is a side view of a scooter-type motorcycle to which a rider restriction device of the present invention is applied. A vehicle body frame 10 includes a main frame pipe 12 which fixes a head pipe 11 on a front end portion thereof, a cross pipe 13 which is fixedly secured to a rear end portion of the main frame pipe 12 at a right angle and horizontally, and a pair of rear frame pipes 14 (14L, 14R) which have respective front ends thereof contiguously formed on both end portions of the cross pipe 13 as main constitutional parts.

The above-mentioned main frame pipe 12 is constituted by integrally and contiguously forming a down frame portion 12a which is inclined rearwardly and downwardly and spaced rearwardly from the head pipe 11 and a lower frame portion 12b which is extended rearwardly from a rear end of the down frame portion 12a in a substantially horizontal posture. The above-mentioned cross pipe 13 extends in the lateral direction from the vehicle body frame 10 and a rear end portion of the above-mentioned main frame pipe 12 is fixedly secured to a center portion of the cross pipe 13 at a right angle. The above-mentioned pair of left and right rear frame pipes 14 are constituted by integrally and contiguously forming rising frame portions 14a which extend rearwardly and upwardly from both end portions of the cross pipe 13 and upper frame portions 14b which extend rearwardly from rear ends of the rising frame portions 14a and, at the same time, are curved in a horizontal plane such that openings of rear end portions thereof face each other in an opposed manner.

On the above-mentioned head pipe 11, a front fork 15 which constitutes a steering member for supporting a front wheel Wf is steerably supported. To an upper end of the front fork 15, a steering handle 16 is connected by way of a handle pipe 20 which constitutes a handle connecting member. On a front portion of the above-mentioned rear frame pipe 14, a power unit P which is formed of an engine E which is arranged on a front side of a rear wheel Wr and a variable-speed transmission M which is arranged on a left side of the rear wheel Wr is tiltably supported in the vertical direction. The rear wheel Wr is pivotally supported on a rear portion of the power unit P. An air cleaner 29 is arranged on a left side of an upper portion of the rear wheel Wr.

Between a rear portion of the power unit P and the left-side rear frame pipe 14L, a rear cushion unit 17 is provided. An exhaust pipe 18 which guides an exhaust gas from the engine E extends toward a right side of the rear wheel Wr from the engine E, while the exhaust pipe 18 is connected with an exhaust muffler 19 which is arranged on a right side of the rear wheel Wr. Between front portions of the left and right rear frame pipes 14, an accommodation box 25 is supported in a state that the accommodation box 25 is arranged above the above-mentioned engine E.

The vehicle body frame 10 is covered with a vehicle body cover 21 made of synthetic resin, wherein the vehicle body cover 21 includes a leg shield 22 which covers a front portion of a leg of a rider, a step floor 23 which is contiguously formed with a lower portion of the leg shield 22 to allow the leg of the rider to be placed thereon and a side cover 24 which is contiguously formed with the step floor 23 and covers a rear end portion of the vehicle body from both sides.

The above-mentioned accommodation box 25 and fuel tank (not shown in the drawing) are covered with the above-mentioned side cover 24, while a seat 26 which covers the accommodation box 25 from above is mounted on an upper portion of the side cover 24 in a state that the seat 26 can be opened and closed. That is, the step floor 23 is formed on the vehicle body cover 21 in a state that the step floor 23 is arranged between the steering handle 16 and the seat 26 and, below a rear end of the step floor 23, a frame-side bracket 27 which is provided for tiltably supporting the power unit P on the vehicle body frame 10 is arranged.

Figure 2:
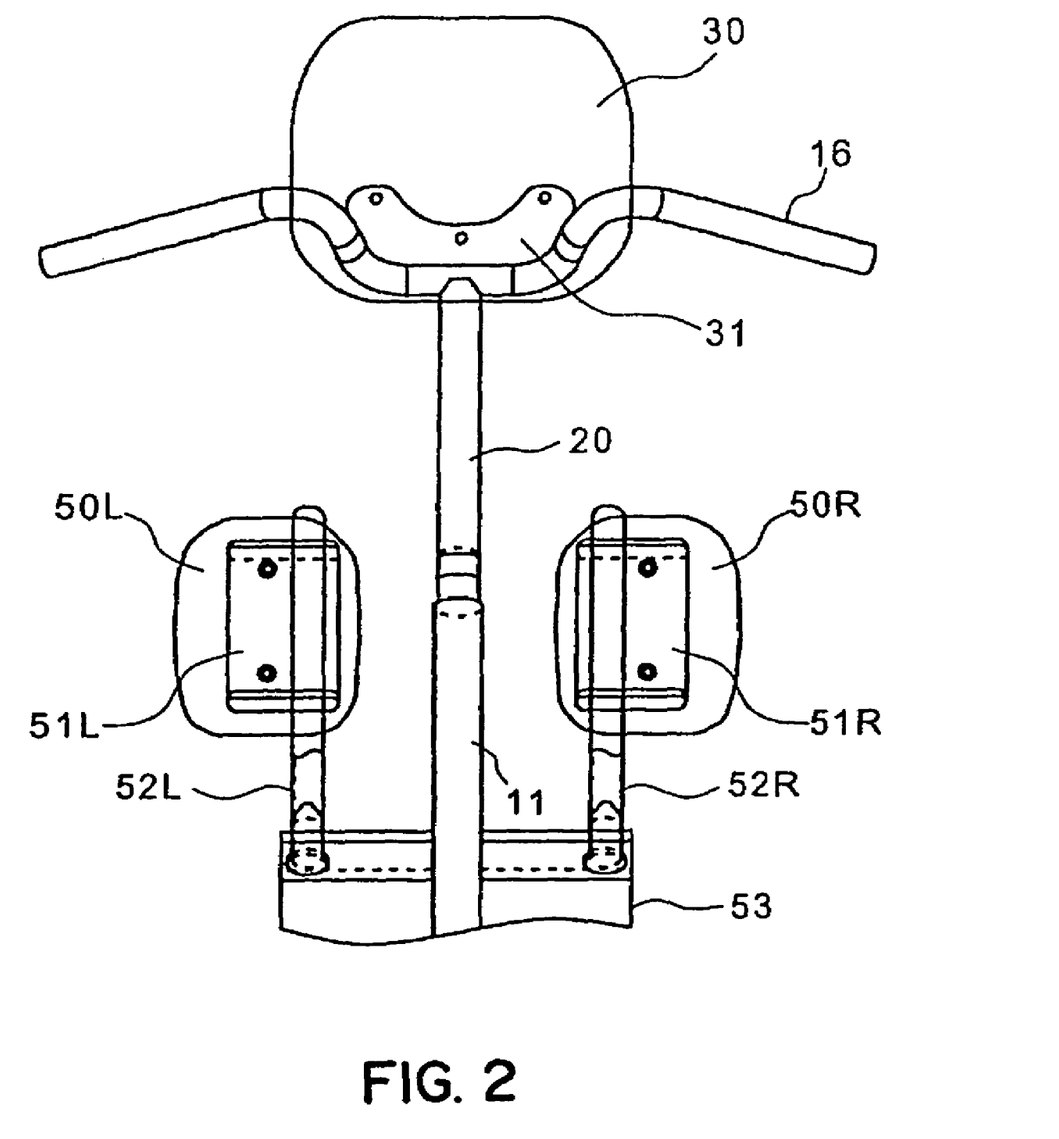
FIG. 2 A front view of a knee portion pad.

To explain the embodiment also in conjunction with FIG. 2, a plate member 31 is fixed to the above-mentioned steering handle 16, and a breast portion pad 30 is mounted on the plate member 31 in a state that the breast portion pad 30 faces a rider who sits on the seat 26 in an opposed manner. Further, in this embodiment, a connecting member 53 is fixed to a lower portion of the head pipe 11, and a pair of left and right pad support pipes 52(L, R) are erected from the connecting member 53 in a state that the pad support pipes 52 are directed in the oblique upward direction along the handle post 11. On upper portions of the respective pad support pipes 52, a pair of left and right knee portion pads 50(L, R) are mounted in a posture that the knee portion pads 50 are directed toward knee portions of a rider by way of the respective plate members 51 (L, R).

Figure 3:
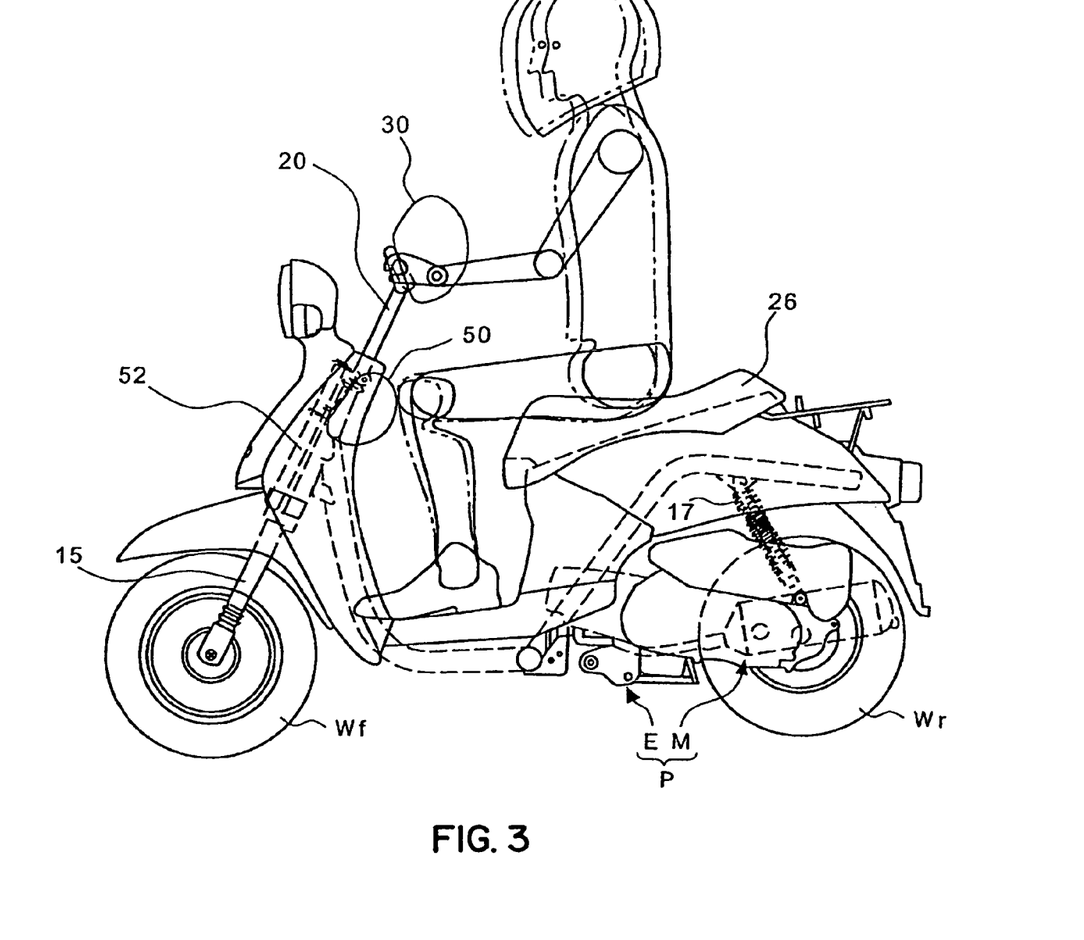
FIG. 3 A view showing a state in which the movement of a rider is prevented by the knee portion pad.

With a provision of these knee portion pads 50, as indicated by a broken line in FIG. 3, even when a lower half part of the rider is moved frontwardly due to an inertia at the time of braking or the like, the knee portions of the rider are pushed by the knee portion pads 50 and the further movement of the knee portions of the rider is prohibited and hence, the frontward movement of the rider is restricted within a given range. Further, according to this embodiment, when a frontward load which exceeds a given reference value is applied to the knee pads 50, a load absorbing function which absorbs the frontward load and alleviates a load applied to the rider is imparted to the above-mentioned pad support pipe 52.

Figure 4:
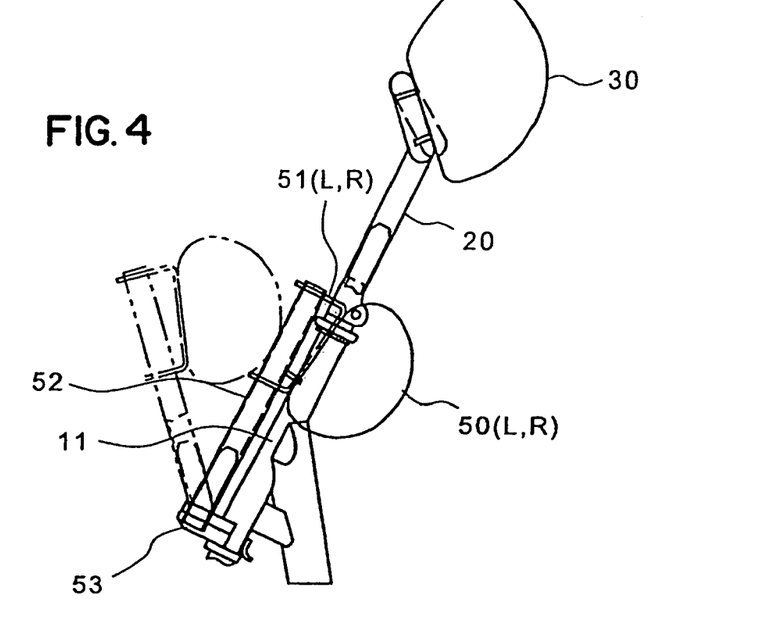
FIG. 4 A side view of a load absorbing portion.

FIG. 4 is a side view for explaining the above-mentioned load absorbing function. When the frontward load which exceeds the given reference value is applied to the above-mentioned knee portion pads 50, the above-mentioned pad support pipe 52 starts a frontward deflection thereof in the vicinity of an upper surface of the above-mentioned connecting member 53. When a stress exceeds a yielding point (a stress limit) of the pad support pipe 52, the plastic deformation starts and hence, as indicated by a broken line in the drawing, the pad support pipe 52 starts a frontward bending thereof.

In general, when a yielding point of a material exceeds a stress limit, an elastic force is lost and hence, the above-mentioned knee portion pads 50 cannot receive the frontward load attributed to the knee portions. In this embodiment, however, as explained in detail later, a load absorbing portion is formed on the above-mentioned pad support pipe 52 and hence, the pad support pipe 52 can maintain the elasticity even when the pad support pipe 52 exceeds the stress limit.

Figure 5:
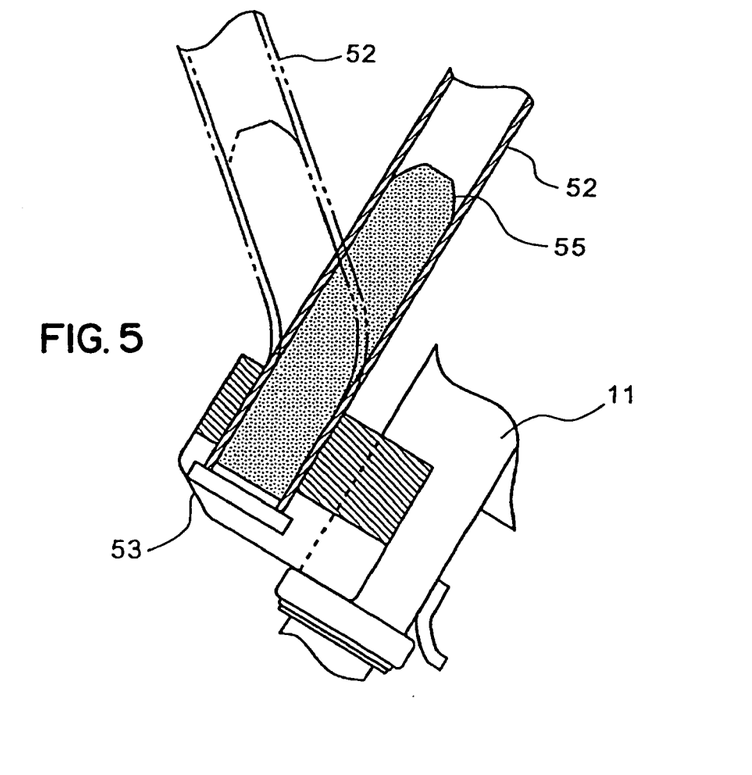
FIG. 5 A cross-sectional view of a first embodiment of the load absorbing portion.

FIG. 5 is a cross-sectional view of a first embodiment of the above-mentioned load absorbing portion and symbols equal to the above-mentioned symbols indicate identical or similar portions. In this embodiment, the pad support pipe 52 has a lower end portion thereof fixed to a connecting member 53 in a state that the lower end portion is inserted in and penetrates the connecting member 53, while a longitudinal elastic member 55 penetrates in and is fixed to the inside of the lower end portion.

In such a constitution, when a frontward load which exceeds a given reference value is applied to the above-mentioned knee portion pad 50, the above-mentioned pad support pipe 52 starts a deflection thereof. When a stress exceeds a yielding point of the pad support pipe 52, the plastic deformation starts and, as indicated by a chain line in the drawing, the pad support pipe 52 starts bending in the frontward direction.

Figure 11:
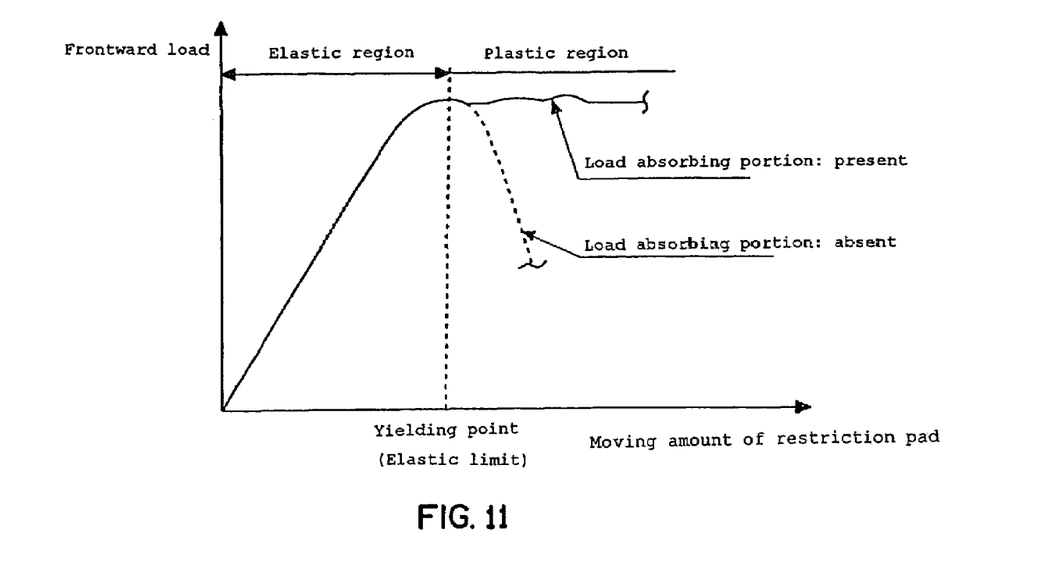
FIG. 11 A view showing the relationship between a moving amount of the knee portion pad and a load applied to a rider.

FIG. 11 shows the relationship between a frontward moving amount of the above-mentioned knee portion pad 50 and the load applied to the knee portions of the rider. When the above-mentioned elastic member 55 is not inserted into the pad support pipe 52, as indicated by a broken line in the drawing, at a point of time that the stress exceeds the yielding point, the pad support pipe 52 is ruptured or collapsed and hence, the elasticity can not be maintained whereby the load applied to the knee portion pad 50 is escaped.

To the contrary, according to this embodiment, the pad support pipe 52 and the connecting member 53 are firmly connected to each other and, at the same time, both members are elastically connected with each other by the above-mentioned elastic member 55 and hence, even in a plastic region where the stress exceeds the yielding point, there is no possibility that the pad support pipe 52 is ruptured or collapsed whereby the elasticity can be maintained. Accordingly, the relationship between the forward moving amount of the above-mentioned knee portion pads 50 and the load applied to the knee portion of the rider is held at an approximately fixed value even after the pad support pipe 52 exceeds the yielding point whereby even when the load which exceeds the stress limit of the pad support pipe 52 is applied to the above-mentioned knee portion pad 50, a portion of the load is absorbed so that the load applied to the rider can be reduced.

Figure 6:
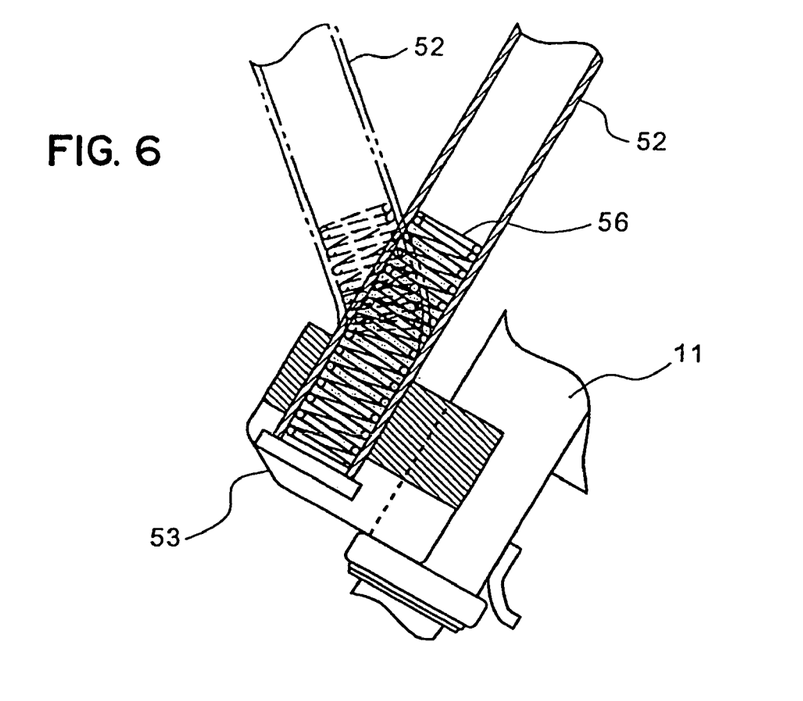
FIG. 6 A cross-sectional view of a second embodiment of the load absorbing portion.

FIG. 6 is a cross-sectional view of a second embodiment of the above-mentioned load absorbing portion and symbols equal to the above-mentioned symbols indicate identical or similar portions. In this embodiment, the pad support pipe 52 has a lower end portion thereof fixed to a connecting member 53 in a state that the lower end portion is inserted in and penetrates the connecting member 53, while a coil spring 56 penetrates in and is fixed to the inside of the lower end portion.

In such a constitution, when a frontward load which exceeds a given reference value is applied to the above-mentioned knee portion pad 50, the above-mentioned pad support pipe 52 starts a deflection thereof. When a stress exceeds a yielding point of is the pad support pipe 52, the plastic deformation starts and, as indicated by a chain line in the drawing, the pad support pipe 52 starts bending in the frontward direction. However, in this embodiment, since the coil spring 56 is inserted into the inside of a bent portion of the pad support pipe 52, even when the pad support pipe 52 exceeds its own yielding point, the pad support pipe 52 is neither broken or collapsed whereby the resiliency can be maintained. Accordingly, even when the load which exceeds the stress limit of the pad support pipe 52 is applied to the knee portion pad 50, a portion of the load is absorbed so that the load applied to the rider can be reduced.

Figure 7:
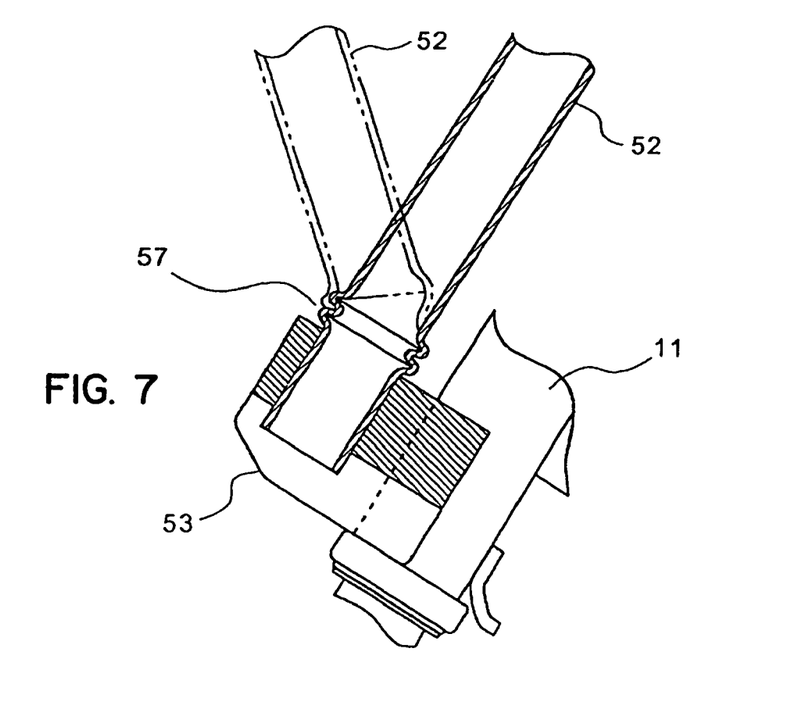
FIG. 7 A cross-sectional view of a third embodiment of the load absorbing portion.

FIG. 7 is a cross-sectional view of a third embodiment of the above-mentioned load absorbing portion and symbols equal to the above-mentioned symbols indicate identical or similar portions. In this embodiment, the pad support pipe 52 has a lower end portion thereof fixed to a connecting member 53 in a state that the lower end portion is inserted in and penetrates the connecting member 53, while a bellows-like collapsible body 57 is formed in the vicinity of an upper portion of the connecting member 53.

In such a constitution, when a frontward load which exceeds a given reference value is applied to the above-mentioned knee portion pad 50, the above-mentioned pad support pipe 52 starts a deflection thereof. When a stress exceeds a stress limit of the bellows-like collapsible body 57, a front portion side of the bellows-like collapsible body 57 is collapsed and the plastic deformation in which a lower portion side of the bellows-like collapsible body 57 extends starts and hence, the pad support pipe 52 starts the frontward bending.

In this manner, since the bellows-like collapsible body 57 is formed on the pad support pipe 52 in this embodiment, even after the plastic deformation starts, the pad support pipe 52 can maintain the elasticity without causing rupture. Accordingly, even when the load which exceeds the stress limit of the pad support pipe 52 is applied to the knee portion pad 50, a portion of the load is absorbed whereby the load applied to the rider can be reduced.

Figure 8:
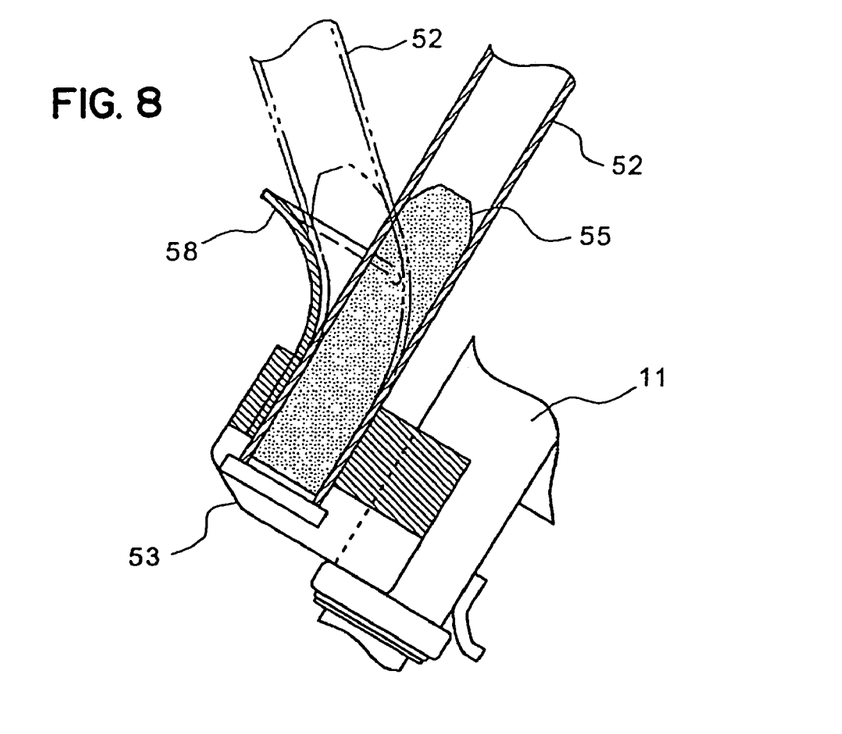
FIG. 8 A cross-sectional view showing one example of a reinforcing member which restricts an inclination angle of a handle pipe.

Here, in the above-mentioned respective embodiments, since the pad support pipe 52 is deflected, corresponding to the increase of a moving amount of the knee portion pad 50, the position of the knee portion pad 50 is lowered. Accordingly, as shown in FIG. 8, in this embodiment, a reinforcing member 58 which restricts a front inclination angle, that is, the moving amount of the knee portion pad 50 is provided below the above-mentioned bending portion of the pad support pipe 52. Due to such a constitution, even when the large frontward load is applied to a restriction pad 30, it is possible to maintain the position of the restriction pad 30 at a given height or more.

Figure 9:
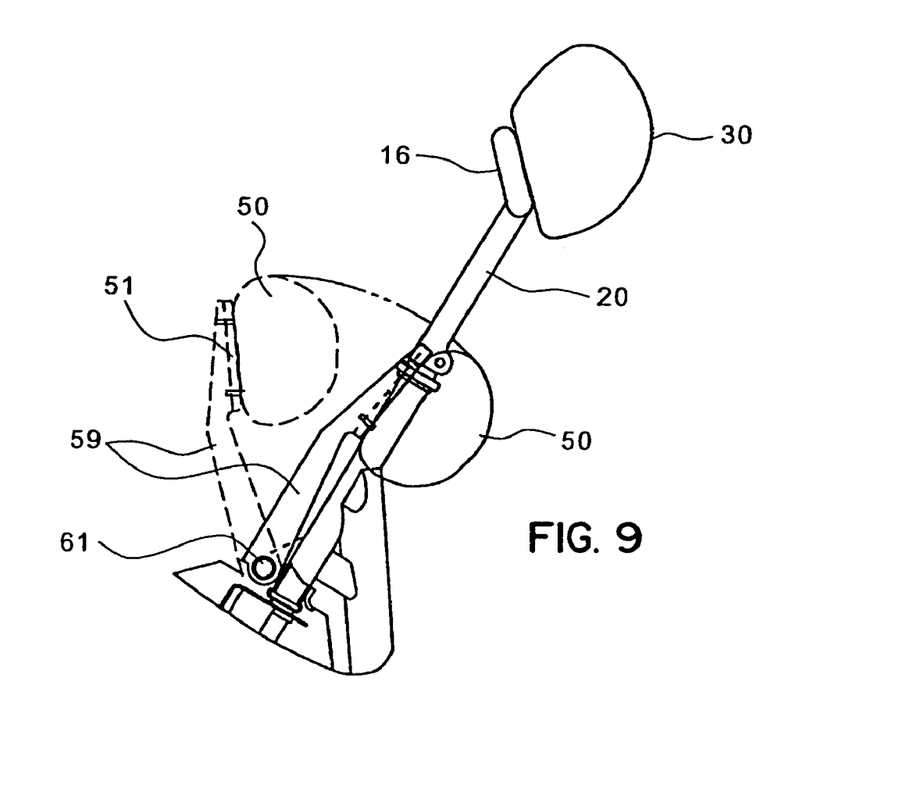
FIG. 9 A side view of a fourth embodiment of the load absorbing portion.

FIG. 9 is a side view with a part broken away of a fourth embodiment of the above-mentioned load absorbing portion, wherein symbols which are equal to the above-mentioned symbols indicate identical or similar portions.

Figure 10:
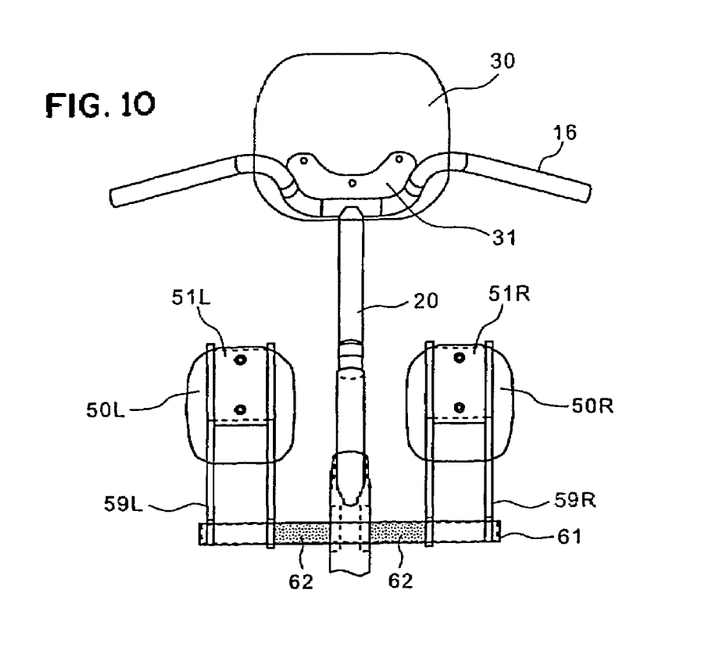
FIG. 10 A front view of the fourth embodiment of the load absorbing portion.

A pipe-like connecting bar 61 penetrates the frame in the lateral direction and is firmly connected using suitable means such as welding or the like. Pad support arms 59(L, R) are vertically mounted on the above-mentioned connecting bar 61, while the pad support arms 59 are extended upwardly in the rear oblique direction using the above-mentioned connecting bar 61 as a fulcrum. On upper end portions of the above-mentioned pad support arms 59, the above-mentioned knee portion pad 50 is positioned and fixed by way of the plate members 51(L, R) in a state that the knee portion pad 50 is directed toward the knee portions of the rider. As shown in FIG. 10, in the inside of the connecting bar 61, a collapse preventing member 62 is filled or inserted. Even after a torsional stress exceeds an elastic limit and the plastic deformation which generates a collapse of the connecting member 61 starts, the collapse preventing member 62 restricts this collapse and allows the above-mentioned connecting bar 61 to maintain a given elastic force.

In such a constitution, when the frontward load is applied to the above-mentioned knee portion pad 50 and a twisting is generated on the connecting bar 61, the pad support arms 59 start the frontward movement. When the frontward load is further applied and, the torsional stress which is applied to the above-mentioned connecting bar 61 exceeds a yielding point (a stress limit) of the connecting bar 61, the plastic deformation (collapse deformation) starts and, as indicated by a broken line in FIG. 9, the pad support arm 59 is rotated in the frontward direction using the connecting bar 61 as a fulcrum. Here, in this embodiment, since the collapse preventing member 62 is inserted in the inside of the connecting bar 61, the collapse of the connecting bar 61 is restricted whereby the connecting bar 61 can maintain the elasticity even in the plastic region which exceeds the yielding point. Accordingly, even when the load which exceeds the stress limit of the pad support arms 59 is applied to the knee portion pad 50, a portion of the load is absorbed and hence, the load applied to the rider can be reduced.

Although embodiments of the present invention have been described thus far, the present invention is not limited to the examples in the drawings and the embodiments described above, and various modification may be made without departing the scope of the present invention, as a matter of course.

We claim:

1. A rider restriction device of a two-wheeled vehicle which restricts the movement of a rider of the two-wheeled vehicle toward a front side of a vehicle body, the rider restriction device comprising:
   a pair of left and right knee portion pads;
   a pad support member for each of said knee portion pads which mounts the knee portion pad on one end side thereof;

a connecting member for each of said pad support members which fixes another end side of each of said pad support members to the vehicle body in a state that the knee portion pads face knee portions of the rider; and a load absorbing member for each of said pad support members mounted in one of said pad support member and said connecting member which absorbs a forward load applied to the knee portion pad thus restricting the plastic deformation of said one of said pad support member and said connecting member.

2. A rider restriction device of a two-wheeled vehicle according to claim 1, wherein each said load absorbing member is a collapse prevention member which restricts the collapse of the pad support member.

3. A rider restriction device of a two-wheeled vehicle according to claim 1, wherein each said load absorbing member is a resilient member which is inserted into a plastic deformation portion of the pad support member.

4. A rider restriction device of a two-wheeled vehicle according to claim 1, wherein each said load absorbing member is a coil spring which is inserted into a plastic deformation portion of the pad support member.

5. A rider restriction device of a two-wheeled vehicle according to claim 1, wherein each said load absorbing member is a bellows-like collapsible body which is formed on the pad support member.

6. A rider restriction device of a two-wheeled vehicle according to claim 1, wherein each said connecting member is a pipe-like connecting bar which is connected with another end side of the pad support member perpendicularly and extends in the lateral direction of a vehicle body, and the load absorbing member is a resilient member which is inserted in the inside of the connecting bar and restricts the torsional deformation of the connecting bar.

7. A rider restriction device of a two-wheeled vehicle according to claim 1, wherein the rider restriction device further includes reinforcing members which restrict a front tilting amount of the pad support members.

* * * * *